United States Patent
Borah et al.

(10) Patent No.: US 10,375,197 B2
(45) Date of Patent: Aug. 6, 2019

(54) DYNAMIC KEY GENERATION FOR IDENTIFYING DATA SEGMENTS

(71) Applicant: Riverbed Technology, Inc., San Francisco, CA (US)

(72) Inventors: Hemanga Krishna Borah, Sunnyvale, CA (US); Manjunath Chinni Lakshmana, Santa Clara, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 236 days.

(21) Appl. No.: 15/375,010

(22) Filed: Dec. 9, 2016

(65) Prior Publication Data

US 2017/0171345 A1 Jun. 15, 2017

Related U.S. Application Data

(60) Provisional application No. 62/266,251, filed on Dec. 11, 2015.

(51) Int. Cl.
*H04L 29/08* (2006.01)
*G06F 12/0864* (2016.01)

(52) U.S. Cl.
CPC ...... *H04L 67/2842* (2013.01); *G06F 12/0864* (2013.01); *H04L 67/02* (2013.01); *H04L 67/1097* (2013.01)

(58) Field of Classification Search
CPC .................. H04L 67/02; H04L 67/2842
See application file for complete search history.

(56) References Cited

U.S. PATENT DOCUMENTS

| | | | |
|---|---|---|---|
| 7,069,268 B1* | 6/2006 | Burns | H04L 45/00 707/770 |
| 7,076,608 B2* | 7/2006 | Arunagirinathan | G06F 16/24552 711/118 |
| 8,977,681 B2* | 3/2015 | Zhu | H04L 67/2847 709/200 |
| 9,356,824 B1* | 5/2016 | Khanal | H04L 29/12047 |
| 9,467,525 B2* | 10/2016 | Arseniev | H04L 67/2842 |
| 9,563,717 B2* | 2/2017 | Shrum, Jr. | G06F 16/9574 |
| 2002/0103848 A1* | 8/2002 | Giacomini | H04L 67/2847 709/200 |
| 2007/0104326 A1* | 5/2007 | Feigenbaum | G06F 21/6227 380/44 |
| 2008/0229017 A1* | 9/2008 | Plamondon | H04L 67/2847 711/118 |
| 2008/0229021 A1* | 9/2008 | Plamondon | H04L 67/2847 711/125 |

(Continued)

*Primary Examiner* — Lashonda T Jacobs
(74) *Attorney, Agent, or Firm* — Park, Vaughan, Fleming & Dowler LLP; Laxman Sahasrabuddhe

(57) ABSTRACT

Systems and techniques are described for caching resources. Multiple distinct resource identifiers that correspond to the same resource can be automatically collected, wherein the multiple distinct resource identifiers are included in resource requests that are sent from at least one client to at least one server. Next, a key can be automatically determined that matches the multiple distinct resource identifiers by analyzing the multiple distinct resource identifiers. A resource request can be received from a client that includes a resource identifier, and in response to determining that the resource identifier matches the key, the resource can be sent to the client.

18 Claims, 3 Drawing Sheets

(56) References Cited

U.S. PATENT DOCUMENTS

| | | | |
|---|---|---|---|
| 2008/0229024 A1* | 9/2008 | Plamondon | H04L 67/28 711/126 |
| 2010/0095066 A1* | 4/2010 | Rodgers | G06F 9/54 711/125 |
| 2011/0131341 A1* | 6/2011 | Yoo | G06F 16/9574 709/237 |
| 2014/0222900 A1* | 8/2014 | Todd | H04L 67/2842 709/203 |
| 2015/0237159 A1* | 8/2015 | Lawrence | H04L 67/2814 709/213 |
| 2016/0050292 A1* | 2/2016 | Chen | G06F 16/951 709/213 |
| 2017/0171168 A1* | 6/2017 | Reshadi | H04L 63/0428 |

* cited by examiner

DYNAMIC KEY GENERATION FOR IDENTIFYING DATA SEGMENTS

RELATED APPLICATION

This application claims benefit of U.S. Provisional Patent Application No. 62/266,251, filed 11 Dec. 2015, having the same title and inventors, the contents of which are herein incorporated by reference in their entirety for all purposes.

BACKGROUND

The present disclosure relates to network communications in general and to optimizing network communications in particular. Data communications networks, such as local area networks (LANs) and wide area networks (WANs) often include a variety of network devices for sending, receiving, directing, and optimizing network data traffic. WAN optimization devices are one type of network device that improve network performance in reading and/or writing data over a WAN such as the internet or a private WAN. WAN optimization devices can operate alone or in pairs to compress, prefetch, cache, and otherwise optimize network traffic. For example, a WAN optimization device may intercept network traffic from a server before it reaches the WAN; compress this network traffic; and communicate this compressed network traffic over the WAN to a second WAN optimization application or device near or within a client device. The second WAN optimization application or device can then decompress or otherwise process the compressed network traffic to reconstruct the original network traffic and forward it, if necessary, to the destination client device.

WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers. Additionally, techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. In this disclosure, the term "WAN optimization device" is generally used to refer to any device that performs network optimization, and "WAN optimization" is used to refer to any technique that is used for performing network optimization.

In some services, a client application can use a resource identifier to access a resource. However, it can be very challenging to perform caching for some of these services. For example, in a popular video service that is available over the Internet, video segments are accessed using Hypertext Transfer Protocol (HTTP) requests. However, the Universal Resource Locators (URLs) of these HTTP requests vary between requests for the same video segment, which makes it impossible to use exact URL matching for caching the video segments. Therefore, what are needed are techniques and systems to improve network performance for such services.

SUMMARY

Some embodiments described herein provide techniques and systems for caching resources using dynamic key generation. In some embodiments, a caching device can automatically collect multiple distinct resource identifiers that correspond to a resource, wherein the multiple distinct resource identifiers are included in resource requests that are sent from at least one client to at least one server, and wherein the caching device is located on a network path between the at least one client and the at least one server. A caching device can generally be any device that is capable of improving network performance by caching resources. Next, the caching device can automatically determine a key that matches the multiple distinct resource identifiers by analyzing the multiple distinct resource identifiers. The caching device can then receive a resource request from a client that includes a resource identifier, and in response to determining that the resource identifier matches the key, the caching device can send the resource to the client. In some embodiments, each resource request can be a HTTP request. In some embodiments, each resource identifier can include a sequence of parameter values.

In some embodiments, automatically determining the key that matches the multiple distinct resource identifiers by analyzing the multiple distinct resource identifiers can comprise: (1) identifying common parameter values that are common to all of the multiple distinct resource identifiers, and (2) determining the key based on the common parameter values.

In some embodiments, automatically collecting the multiple distinct resource identifiers that correspond to the resource can comprise: (1) monitoring the resource requests and resources corresponding to the resource requests that are communicated between the at least one client and the at least one server, (2) computing a hash value for each resource based on contents of the resource, wherein each hash value is used to uniquely identify each unique resource, and (3) collecting distinct resource identifiers in the resource requests that correspond to resources with the same hash value. In some embodiments, automatically collecting the multiple distinct resource identifiers can comprise collecting a sufficient number of distinct resource identifiers so that a diversity condition is satisfied by the collected distinct resource identifiers.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention.

Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

According to one definition, a computer is any device that is capable of performing computations. In some embodiments, a computer can include a processing mechanism that is capable of executing instructions stored on a storage medium. Examples of computers include, but are not limited to, handheld computers, laptop computers, desktop computers, distributed computers, printers, appliances, etc.

According to one definition, a network is an interconnection of one or more devices that is capable of delivering information from one computer to another computer. Examples of networks include, but are not limited to, wireless and wired networks, local area networks (LANs), metropolitan area networks (MANs), WANs, private networks, public networks, intranets, internets, etc.

Figure 1:
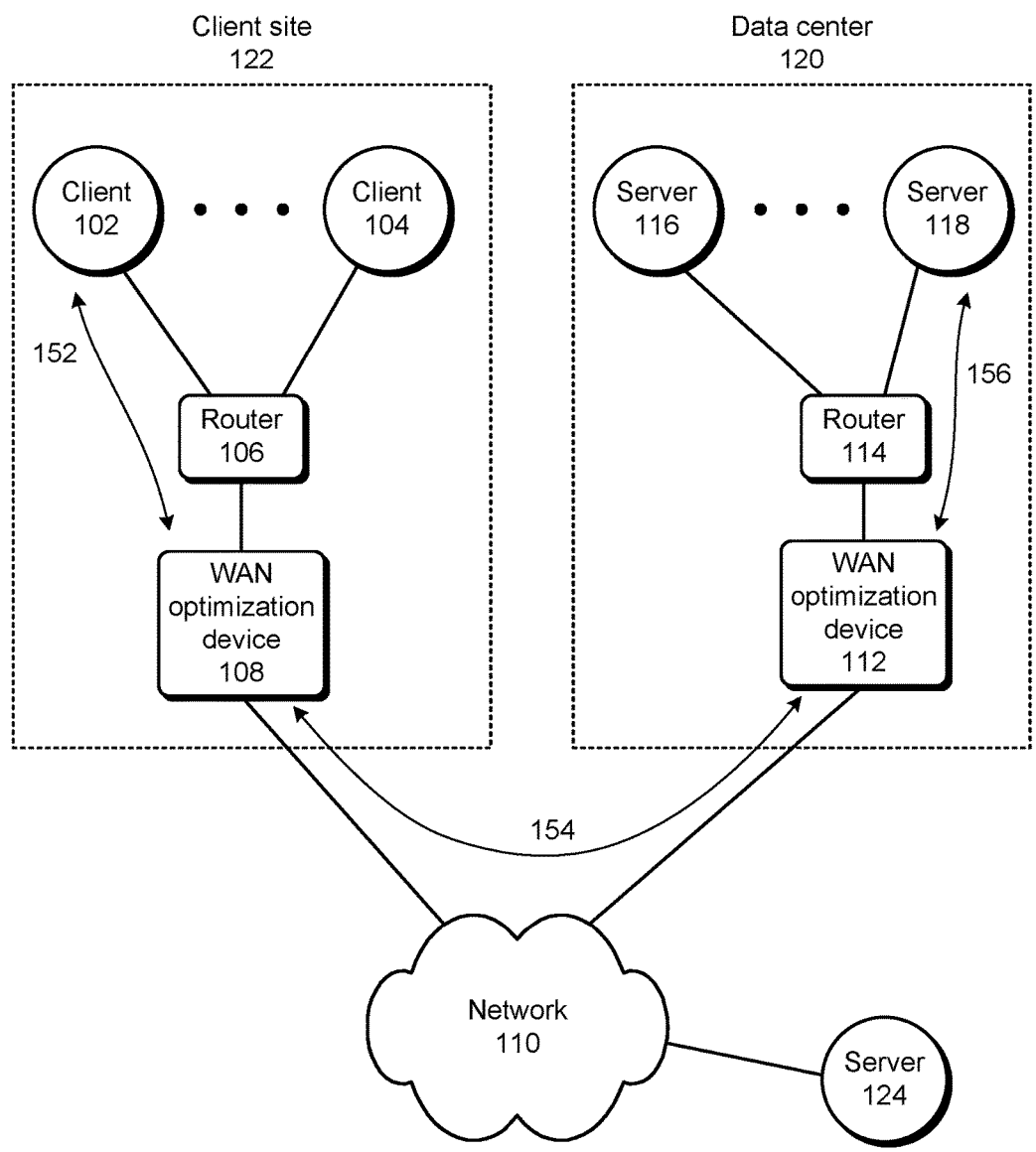
FIG. 1 illustrates a network in accordance with some embodiments described herein.

FIG. 1 illustrates a network in accordance with some embodiments described herein. Although some of the examples described in this disclosure are in the context of a WAN, the disclosed systems and techniques can generally be used to improve performance of any type of network.

In the example illustrated in FIG. 1, remote site 122 can be a company's headquarters or a company's regional office. Data center 120 can host servers and data storage systems for the company's enterprise network. Specifically, data center 120 can be owned and/or managed by a cloud computing service provider. Remote site 122 includes one or more clients, e.g., clients 102, 104, etc., router 106, and WAN optimization device 108. Data center 120 includes one or more servers, e.g., servers 116, 118, etc., router 114, and WAN optimization device 112. Server 124 can generally be any server that is reachable via network 110, e.g., any server that is reachable via the Internet. The number and types of devices shown in FIG. 1 are for illustration purposes only and are not intended to limit the scope of this disclosure. For example, in some embodiments, data center 120 may include one or more load balancers, one or more switches, one or more caching devices, etc.

WAN optimization device 108 can establish connection 154 with WAN optimization device 112, and can use connection 154 to optimize at least some communications between clients in client site 122 and servers in data center 120. For example, WAN optimization devices 108 and 112 can intercept a connection between client 102 and server 116 and establish the following two connections: connection 152 between client 102 and WAN optimization device 108, and connection 156 between server 118 and WAN optimization device 112. The interception may be performed transparently, i.e., client 102 and server 118 may communicate with each other as if they had established an end-to-end connection without realizing that, in fact, the end-to-end connection was split into multiple connections by WAN optimization devices 108 and 112.

Some embodiments described herein provide caching techniques that can be implemented in a device that is located along a path between a client and a server. For example, the caching techniques described herein can be implemented in a router (e.g., routers 106, 114, etc.) or a WAN optimization device (e.g., WAN optimization devices 108, 112, etc.) or any other device that is located in the path between a client (e.g., clients 102, 104) and a server (e.g., servers 116, 118, 124, etc.).

Some techniques for caching resources rely on creating static regular expressions that are applied on the distinct resource identifiers (e.g., distinct URLs) to turn them into keys. The word "static" in the term "static regular expressions" refers to the fact that the static regular expressions are not automatically updated by a caching device based on analyzing the resource identifiers (e.g., the static regular expressions may be created and maintained manually). A major challenge with this approach is that the nature of the distinct identifiers can change over time when the software that provides the service is update (e.g., the URLs that access the same video segment can change over time as the client software is updated over time). The change in the resource identifiers over time requires corresponding change in the regular expressions over time. Manually maintaining multiple versions of static regular expressions for different versions of the client software, as well as manually ensuring that the static regular expression is up-to-date for the latest version of the client software is tedious. Additionally, this approach is also highly error prone because it is manual, and an erroneous static regular expression can lead to (i) failure of the caching optimization and/or (ii) data inconsistency problems if the resulting keys are incorrect.

The caching techniques based on dynamic key generation described herein do not suffer from the above-described drawbacks, and can be used to map a resource identifier to a resource when a client uses multiple distinct resource identifiers to access the same resource.

Resource Caching Based on Dynamic Key Generation

Figure 2:
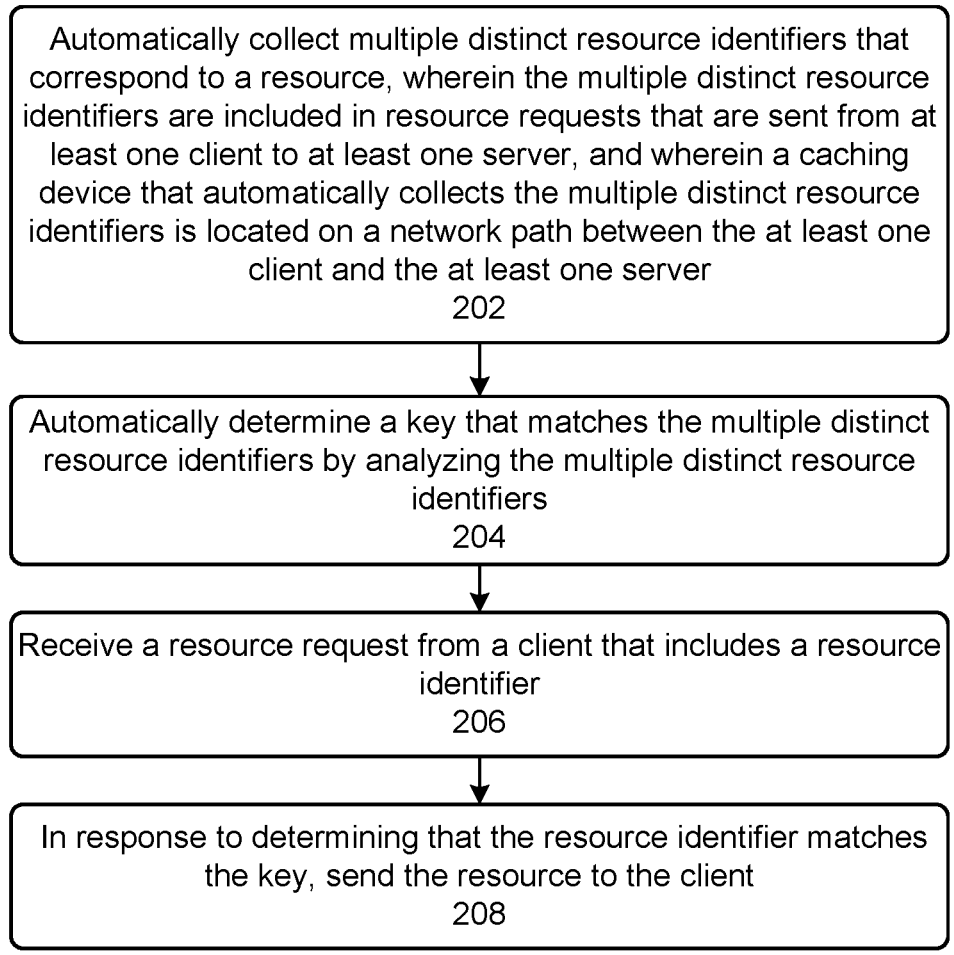
FIG. 2 illustrates a process for resource caching based on dynamic key generation in accordance with some embodiments described herein.

FIG. 2 illustrates a process for resource caching based on dynamic key generation in accordance with some embodiments described herein. The process illustrated in FIG. 2 can be performed by a caching device, which can generally be any device that is capable of improving network performance by caching resources. For example, the term "caching device" may refer to routers 106 or 114, WAN optimization devices 108 or 112, or any other device that is located on a network path between a client and a server.

The process can begin by automatically collecting multiple distinct resource identifiers that correspond to a resource, wherein the multiple distinct resource identifiers are included in resource requests that are sent from at least one client to at least one server, and wherein a caching device that collects the multiple distinct resource identifiers is located on a network path between the at least one client and the at least one server (block 202). In some embodiments, each resource request is an HTTP request. In some embodiments, each resource identifier can include a sequence of parameter values. For example, each resource identifier can be a comma delimited sequence of parameter name and value pairs.

In some embodiments, automatically collecting the multiple distinct resource identifiers that correspond to the resource can comprise: (1) monitoring the resource requests, and monitoring the resources corresponding to the resource requests, wherein the resource requests and the corresponding resources are communicated between the at least one client and the at least one server (e.g., a client can send a resource request to a server, and the server can send the requested resource back to the client, and the caching device can monitor both of these communications), (2) computing a hash value for each resource based on contents of the resource, wherein each hash value is used to uniquely identify each unique resource (an appropriate hash function can be selected that maps each unique resource to a unique hash value based on the contents of the resource), and (3) collecting distinct resource identifiers in the resource requests that correspond to resources with the same hash value. For example, if distinct resource identifiers RID-1, RID-2, RID-3, . . . , RID-n all map to the same hash value H, then the distinct resource identifiers RID-1, RID-2, RID-3, ..., RID-n can be analyzed for dynamic key generation. In some embodiments, automatically collecting the multiple distinct resource identifiers comprises collecting a sufficient number of distinct resource identifiers so that a diversity condition is satisfied by the collected distinct resource identifiers. For example, in a video service example, the process may continue collecting distinct resource identifiers until the process can guarantee that dynamic key generation will be based on a first minimum threshold number of video segment requests spanning across a second minimum threshold number of videos, with at least a third minimum threshold number of repetitions of each video segment.

Next, the process can automatically determine a key that matches the multiple distinct resource identifiers by analyzing the multiple distinct resource identifiers (block 204). In some embodiments, automatically determining the key that matches the multiple distinct resource identifiers by analyzing the multiple distinct resource identifiers can comprise: (1) identifying common parameter values that are common to all of the multiple distinct resource identifiers, and (2) determining the key based on the common parameter values.

The process can then receive a resource request from a client that includes a resource identifier (block 206). Next, in response to determining that the resource identifier matches the key, the process can send the resource to the client (block 208). Specifically, for key that was automatically determined in block 204, the caching device can locally store a copy of the corresponding resource on a local storage medium. When a request identifier (which is in a resource request received from a client) matches a key, the caching device can send the corresponding resource (which is locally stored) to the client, instead of forwarding the resource request to the server, thereby improving network performance. In some embodiments, the set of keys that are being used by a caching device can be flushed and regenerated periodically to ensure that the keys automatically and dynamically adjust to changes in the client software.

Figure 3:
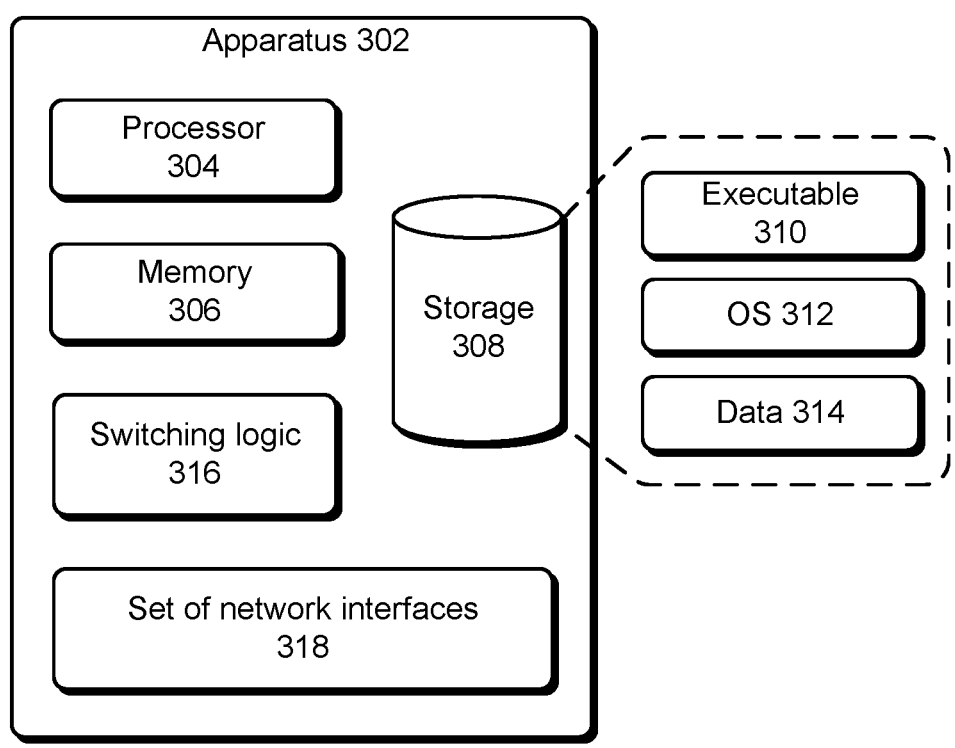
FIG. 3 illustrates an apparatus in accordance with some embodiments described herein.

FIG. 3 illustrates an apparatus in accordance with some embodiments described herein. Apparatus 302 (which can be a caching device) comprises processor 304, memory 306 (e.g., a volatile or non-volatile random access memory), and storage 308 (e.g., a flash memory device or a disk drive). Storage 308 can store executable 310, operating system 312, and data 314.

Apparatus 302 also includes switching logic 316 and set of network interfaces 318. The components in apparatus 302 can communicate with one another using a communication mechanism, e.g., a bus, a backplane, and/or a switching fabric.

Executable 310 can include instructions that, when executed by processor 304, cause apparatus 302 to perform one or more methods that are implicitly or explicitly described in this disclosure. Data 314 can include any data that is inputted into or outputted by executable 310. Set of network interfaces 318 can be used to transmit data to and/or receive data from other communication devices. Switching logic 316 can forward network traffic received on one or more network interfaces in accordance with switching/forwarding/routing information stored in apparatus 302. Specifically, in some embodiments, switching logic 316 can be configured to perform one or more methods that are implicitly or explicitly described in this disclosure.

SOME EXAMPLE EMBODIMENTS

Suppose that a client accesses a segment of a video by presenting a set of parameters to the server as follows: "Request(Segment_s, Video_v) by using Set{param1=value1, param2=value2, paramn=valuen}." Now, suppose a repeated access of the same segment generates the following three distinct resource identifiers:

Request(Segment1, Video1) by using Set{param1=1, param2=23, param3=abc, param_n=uv}.
Request(Segment1, Video1) by using Set{param1=1, param2=34, param3=abc, param_n=vw}.
Request(Segment1, Video1) by using Set{param1=1, param2=45, param3=abc, param_n=wx}.

If the entire set of parameters remain distinct across multiple accesses, it is impossible for the server to map them to the same segment. In other words, the repeated access is only possible if all or subset of the parameters remains the same across multiple requests. In some embodiments, the set of parameters that remain the same can then be treated as the Key used for identifying the segment. In other words, in some embodiments, Key=Set{parameters whose values remain the same across multiple requests for the same segment}.

In some embodiments, this property of the multiple distinct resource identifiers is taken advantage of in computing the key dynamically. For example, considering the above example of resource requests for (Segment1, Video1), the parameters can be tabularized as follows:

| param1 = 1 | param2 = 23 | param3 = abc | ... paramn = uv |
| param1 = 1 | param2 = 34 | param3 = abc | ... paramn = vw |
| param1 = 1 | param2 = 45 | param3 = abc | ... paramn = wx |

Note that the values of param1 and param3 do not change across multiple requests for the same video segment. This implies that the key for storing and identifying a segment can be: Key=Set{param1 and its value, param3 and its value}. Specifically, in block 204 of FIG. 2, the process may determine the key as follows "Key=Set{param1=1, param3=abc}".

To summarize, the first step in dynamic key generation can involve a collection of dataset that we can use for key generation. Data collection can involve storing a map of Set of parameters from requests and the hash of the segment. The collection can be performed until a sufficient number of repeated accesses has been collected.

It is important that the dataset, through which the key is derived, is diverse enough such that any chance of the Key consisting of non-repeating parameter is eliminated. For this reason, the dataset can be subjected to the following conditions in some embodiments:

Requests are collected from multiple videos. A minimum of V videos is required.

Requests are collected from videos with multiple segments. A minimum of S segments in each video is required.

Requests from segments that are repeatedly accessed. A minimum of R repetitions is required.

The above set of diversity conditions can ensure that the Key is derived based on (S*R) number of requests spanning across V number of videos, with a guaranteed R number of repetitions of each segment (where S is the minimum number of segments in each video).

Once the data collection with a sufficient level of diversity is completed, the set of parameters that remain the same across multiple requests can be derived as the key. Once the key is derived, it can be used for building and persisting mappings for video segments, which can help in providing latency optimization through caching.

Note that embodiments described herein do not require regular expressions, thereby eliminating the need for manual configuration by end users. Additionally, since the key is computed at run time, it's tailored to specific environments where the solution is deployed. For example, the behavior of the same web-based video service may be different in different geographical regions. Finally, by incorporating sanity checks for the key generation at regular intervals, key computation can be retriggered if there are any client or server software changes in video services. This makes the embodiments described herein adaptive. Once again, no configuration is required from end users. For example, if an update to a client software causes the client to use param1 and param4 (instead of param1 and param3) to uniquely identify resources, then by flushing and regenerating the keys, the caching device can adapt to software update because, when the keys are regenerated, the caching device will determine the key based on the combination of param1 and param4 (instead of basing it on the combination of param1 and param3).

Further embodiments can be envisioned to one of ordinary skill in the art. Combinations or sub-combinations of the subject matter disclosed herein can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for resource caching based on dynamic key generation, the method comprising:
   a caching device automatically collecting multiple distinct resource identifiers that correspond to a resource, wherein the multiple distinct resource identifiers are included in resource requests that are sent from at least one client to at least one server, and wherein the caching device is located on a network path between the at least one client and the at least one server;
   the caching device automatically determining a key that matches the multiple distinct resource identifiers by analyzing the multiple distinct resource identifiers;
   the caching device receiving a resource request from a client that includes a resource identifier; and
   in response to the caching device determining that the resource identifier matches the key, the caching device sending the resource to the client.

2. The method of claim 1, wherein each resource request is a Hypertext Transfer Protocol (HTTP) request.

3. The method of claim 2, wherein each resource identifier includes a sequence of parameter values.

4. The method of claim 3, wherein said automatically determining the key that matches the multiple distinct resource identifiers by analyzing the multiple distinct resource identifiers comprises:
   identifying common parameter values that are common to all of the multiple distinct resource identifiers; and
   determining the key based on the common parameter values.

5. The method of claim 1, wherein said automatically collecting the multiple distinct resource identifiers that correspond to the resource comprises:
   monitoring the resource requests and resources that are communicated between the at least one client and the at least one server;
   computing a hash value for each resource based on contents of the resource, wherein each hash value is used to uniquely identify each unique resource; and
   collecting distinct resource identifiers in the resource requests that correspond to resources with the same hash value.

6. The method of claim 1, wherein said automatically collecting the multiple distinct resource identifiers comprises collecting a sufficient number of distinct resource identifiers so that a diversity condition is satisfied by the collected distinct resource identifiers.

7. A non-transitory computer-readable storage medium storing instructions that, when executed by a caching device, cause the caching device to perform a method for resource caching based on dynamic key generation, the method comprising:
   automatically collecting multiple distinct resource identifiers that correspond to a resource, wherein the multiple distinct resource identifiers are included in resource requests that are sent from at least one client to at least one server, and wherein the caching device is located on a network path between the at least one client and the at least one server;
   automatically determining a key that matches the multiple distinct resource identifiers by analyzing the multiple distinct resource identifiers;
   receiving a resource request from a client that includes a resource identifier; and
   in response to determining that the resource identifier matches the key, sending the resource to the client.

8. The non-transitory computer-readable storage medium of claim 7, wherein each resource request is a Hypertext Transfer Protocol (HTTP) request.

9. The non-transitory computer-readable storage medium of claim 8, wherein each resource identifier includes a sequence of parameter values.

10. The non-transitory computer-readable storage medium of claim 9, wherein said automatically determining the key that matches the multiple distinct resource identifiers by analyzing the multiple distinct resource identifiers comprises:
identifying common parameter values that are common to all of the multiple distinct resource identifiers; and
determining the key based on the common parameter values.

11. The non-transitory computer-readable storage medium of claim 7, wherein said automatically collecting the multiple distinct resource identifiers that correspond to the resource comprises:
monitoring the resource requests and resources that are communicated between the at least one client and the at least one server;
computing a hash value for each resource based on contents of the resource, wherein each hash value is used to uniquely identify each unique resource; and
collecting distinct resource identifiers in the resource requests that correspond to resources with the same hash value.

12. The non-transitory computer-readable storage medium of claim 7, wherein said automatically collecting the multiple distinct resource identifiers comprises collecting a sufficient number of distinct resource identifiers so that a diversity condition is satisfied by the collected distinct resource identifiers.

13. A caching device, comprising:
a processor; and
a non-transitory computer-readable storage medium storing instructions that, when executed by the processor, cause the caching device to perform a method for resource caching based on dynamic key generation, the method comprising:
automatically collecting multiple distinct resource identifiers that correspond to a resource, wherein the multiple distinct resource identifiers are included in resource requests that are sent from at least one client to at least one server, and wherein the caching device is located on a network path between the at least one client and the at least one server;
automatically determining a key that matches the multiple distinct resource identifiers by analyzing the multiple distinct resource identifiers;
receiving a resource request from a client that includes a resource identifier; and
in response to determining that the resource identifier matches the key, sending the resource to the client.

14. The caching device of claim 13, wherein each resource request is a Hypertext Transfer Protocol (HTTP) request.

15. The caching device of claim 14, wherein each resource identifier includes a sequence of parameter values.

16. The caching device of claim 15, wherein said automatically determining the key that matches the multiple distinct resource identifiers by analyzing the multiple distinct resource identifiers comprises:
identifying common parameter values that are common to all of the multiple distinct resource identifiers; and
determining the key based on the common parameter values.

17. The caching device of claim 13, wherein said automatically collecting the multiple distinct resource identifiers that correspond to the resource comprises:
monitoring the resource requests and resources that are communicated between the at least one client and the at least one server;
computing a hash value for each resource based on contents of the resource, wherein each hash value is used to uniquely identify each unique resource; and
collecting distinct resource identifiers in the resource requests that correspond to resources with the same hash value.

18. The caching device of claim 13, wherein said automatically collecting the multiple distinct resource identifiers comprises collecting a sufficient number of distinct resource identifiers so that a diversity condition is satisfied by the collected distinct resource identifiers.

\* \* \* \* \*